United States Patent [19]
Selbie et al.

[11] Patent Number: 5,405,528
[45] Date of Patent: Apr. 11, 1995

[54] MODULAR MICROPOROUS FILTER ASSEMBLIES

[75] Inventors: Michael R. L. Selbie, McMahons Point; Bruce G. Biltoft, North Sydney; Philip Guilfoyle, Lavendar Bay; Noel S. D. Wood, Lindfield, all of Australia

[73] Assignee: Memtec Limited, NSW South Windsor, Australia

[21] Appl. No.: 945,658

[22] PCT Filed: Apr. 19, 1991

[86] PCT No.: PCT/AU91/00156
§ 371 Date: Dec. 8, 1992
§ 102(e) Date: Dec. 8, 1992

[87] PCT Pub. No.: WO91/16124
PCT Pub. Date: Oct. 31, 1991

[30] Foreign Application Priority Data
Apr. 20, 1990 [AU] Australia ............... PJ9722
Apr. 20, 1990 [AU] Australia ............... PJ9723

[51] Int. Cl.⁶ ............................. B01D 63/02
[52] U.S. Cl. .................. 210/232; 210/321.72; 210/340; 210/497.01
[58] Field of Search ........... 210/117, 252, 253, 321.6, 210/321.61, 321.72, 321.78, 321.79, 321.8, 321.87, 321.88, 321.89, 321.9, 340, 341, 446, 447, 450, 483, 488, 500.21, 500.23, 232, 493.2, 497.01

[56] References Cited

U.S. PATENT DOCUMENTS

| | | |
|---|---|---|
| 4,201,673 | 5/1980 | Kanno et al. |
| 4,239,729 | 12/1980 | Hasegawa et al. |
| 4,315,819 | 2/1982 | King et al. |
| 4,416,305 | 11/1983 | Commette et al. |
| 4,547,289 | 10/1985 | Okano et al. |
| 4,600,512 | 7/1986 | Aid. |
| 4,876,012 | 10/1989 | Kopp et al. |
| 5,223,134 | 6/1993 | Riva .................. 210/232 |

FOREIGN PATENT DOCUMENTS

| | | |
|---|---|---|
| 721232 | 5/1933 | Australia. |
| 1096314 | 2/1981 | Canada. |
| 199518 | 10/1986 | European Pat. Off. |
| 1483541 | 6/1967 | France. |
| 2310521 | 12/1976 | France. |
| 3244496 | 5/1984 | Germany. |
| 58143805 | 2/1982 | Japan. |
| 63-163002 | 7/1988 | Japan. |
| 2040723 | 9/1980 | United Kingdom. |
| 870039 | 3/1988 | WIPO. |
| 900470 | 4/1991 | WIPO. |

*Primary Examiner*—Robert A. Dawson
*Assistant Examiner*—W. L. Walker
*Attorney, Agent, or Firm*—Waldron & Associates

[57] ABSTRACT

An improved microporous, modular filter structure assembled from replaceable filter cartridges (25) housed within a filter cartridge assemby (10) connected at opposed ends by means of symmetrical headers (41). The headers include a tube within a tube structure whereby they are adapted to conduct first and second fluids independently to both adjacent, like interconnected headers and into and out of filter cartridges (25) to which each header (41) is connected at both ends of each cartridge. Manifolds (100, 101) include a similar tube within a tube structure which allows them to be connected to the ends of rows of interconnected headers (41) whereby a modular filter bank can be constructed of indefinite dimension and capacity. A valve assembly (63) can be installed in each header (41) whereby the passage of one of the two fluids conductable from the filter cartridge assembly (10) to the header (41) can be isolated from the header ducts so that contamination of the output from adjacent headers can be selectively prevented.

22 Claims, 16 Drawing Sheets

MODULAR MICROPOROUS FILTER ASSEMBLIES

FIELD OF THE INVENTION

This invention relates to filter cartridges adapted to be relatively easily replaced and more particularly, but not exclusively to filter cartridge assemblies that are adapted to be connected together by headers at each end of each cartridge assembly to form a row of filter cartridges. The rows of interconnected filter cartridge assemblies may be connected together in side by side relationship utilising manifolds to form a bank of filter cartridge assemblies.

The invention will be described with reference to hollow fibre filters but it is to be understood that the invention is not necessarily limited thereto as it may be applied to cartridges incorporating other kinds of filter media such as porous membranes in sheet form.

The invention further relates to an improved form of filter cartridge casing, an improved form of header and an improved form of manifold, all of which can work in conjunction with one another to provide an improved microporous filter assembly.

The invention particularly relates to filter assemblies composed of filter cartridge assemblies having opposed, symmetrical headers attached to either end.

The invention also particularly relates to filter assemblies which utilise headers adapted to conduct both feed and filtrate to adjacent like headers and into and out of the filter cartridge assembly to which they are connected.

In a particular form the invention specifically relates to microporous filters whose filter cartridges comprise elongate bundles of microporous, polymeric fibres wherein feed to be filtered is fed to the outside of the bundle of fibres and filtrate is extracted from the ends of the fibre lumens.

DESCRIPTION OF THE PRIOR ART

Typical prior art filter cartridges and banks are shown, for example, in International Patent Application PCT/AU87/00309 and PCT/AU90/00470. The text and drawings of the specifications which accompanied those applications are incorporated herein by cross reference.

Such hollow fibre filters typically comprise an elongate tubular cartridge enclosing a bundle of hollow fibres. At one end of the casing there is a first header which has a feed passageway therethrough and in communication with the interior of the casing and hence the exterior of the fibres. The first header also has a filtrate passageway therethrough and in communication with the open ends of the fibre lumens.

At the other end of the casing there is a second header which has a treated feed passageway therethrough and in communication with the interior of the casing and the exterior of the fibres. The second header also has a filtrate passageway and in communication with the open end of the fibres.

The passageways are formed in off-set portions of the headers that have planar end faces whereby a plurality of such cartridges may be joined together without interconnecting manifolds or pipe work to form a row of filter cartridges. A number of such rows of filter cartridges may be inter-connected in spaced parallel relation to define a bank of filter cartridges.

Other prior art known to the applicant includes U.S. Pat. No. 4,547,289 to Okano et al which discloses a filter arrangement having a removable cartridge. The arrangement disclosed in U.S. Pat. No. 4,547,289 is to be distinguished from embodiments of the present invention by the fact that it discloses only a single ended header arrangement whereby certain features to aid removal of the cartridge from the filter assembly as disclosed in respect of the present invention are not required and not disclosed.

Also known to the applicant is JP 58 143 805 to Nitto Electric Industrial K.K. This application discloses a hollow fibrous membrane bundle which is housed so as to be detachable from the filter assembly. Again, this arrangement is to be distinguished from embodiments of the present invention by virtue of the fact that the filter arrangement of JP 58 143 805 requires an integral stiffener arrangement to maintain the integrity of the filter cartridge during use. Furthermore JP 58 143 805 discloses use of headers which are adapted to conduct only one fluid into or out of the filter cartridge and which are not adapted to communicate with adjacent, like headers.

It is an object of the invention to provide a filter cartridge which permits removal and replacement of the enclosed fibre bundle without the need to disturb the header units at either end of the cartridge.

It is a further object of the present invention to provide an improved fibre bundle to work in conjunction with the filter cartridge It is yet a further object of the invention to provide improved filter header and filter manifold components whereby symmetrical filter cartridges can be produced allowing more compact packing of said filter cartridges into rows and banks.

It is yet a further object of the invention to provide a valve mechanism whereby the output from individual filter cartridges can be selectively sampled and, if necessary, sealed off from the output of adjacent filter modules whereby bad modules can be isolated without the necessity to shut down the entire filter bank.

BRIEF DESCRIPTION OF THE INVENTION

In one broad form of the invention there is provided a replaceable filter cartridge comprising an elongate filter medium terminating in opposed ends adapted to be in fluid communication with a header; each of said ends of said medium attached to respective first and second cartridge end portions; said cartridge end portions acting to bind said filter medium in the region of said each end whereby said elongate filter medium can be releasably mechanically supported by mechanical support of said end portions so as to maintain said end portions a predetermined distance apart.

Preferably said cartridge is elongate and symmetrical and said medium comprises microporous fibres.

Preferably said medium comprises a bundle of microporous fibres; each of said fibres comprising said bundle being generally aligned along the longitudinal axis of said cartridge.

Preferably said cartridge includes an end cap and wherein said end cap includes engagement means for engaging portions of an outer casing assembly whereby said cap is maintained in a fixed mechanical relationship with respect to said outer casing.

Preferably said cartridge includes a slideable cap which is slideable over said end cap whereby the duct defined within said end cap is extended beyond the end of said medium.

In a further broad form of the invention there is provided a filter cartridge assembly comprising the replaceable filter cartridge and a casing together with connecting sleeves.

Preferably there are included first and second connecting sleeves which further include respective second shoulder portions located on an inner surface; said second shoulder portions adapted to engage said circular clip whereby supporting pressure is applied by means of said clip to a first one of said opposed shoulders defining said groove in said cap when said connecting sleeve is in sealed, mating relationship with said header whereby said cap is mechanically supported against motion along the longitudinal axis of said cartridge in a first direction whilst the other of said opposed shoulders defining said groove in said cap is mechanically supported against an opposed surface of said clip which, in turn, is mechanically urged against a lower rim portion of said slideable cap thereby urging said slideable cap to an extended position with respect to said cartridge whereby an opposite end of said slideable cap is urged into sealing relationship with said header at the same time that said connecting sleeve is in sealed, mating position with respect to said header whereby said sealed chamber is divided into a first chamber external to the outer surface of said media and a second chamber defined by the internal surface of said media whereby feed can pass from said header into said outer chamber, through said media which removes particulate matter above a predetermined size therefrom and into said inner chamber and thence out of said cartridge via the inside of said slideable cap to said header.

In yet a further broad form there is provided a header for use with a filter cartridge assembly as described above arranged in banks; said header including a first passageway lying wholly within a second passageway; said first passageway preventing liquid in said first passageway from mixing with liquid in said second passageway within the confines of said header.

Preferably said first passageway communicates with opposed ends of said header and with a third face of said header which is adapted to communicate with said filter cartridge assembly; and said second second passageway communicates with opposed ends of said header and with a third face which is in independent communication with said filter cartridge assembly.

Preferably an outlet from one of said first passageway or said second passageway to said filter cartridge assembly is selectively sealable by valve means.

In yet another broad form of the invention there is provided a filter cartridge assembly comprising:
 i) a body defining a filter chamber;
 ii) replaceable filter media in the chamber dividing the chamber into a feed side and a filtrate side.
 iii) a feed inlet to the chamber and a filtrate outlet from the chamber, and
 (iv) a transfer header in fluid communication with the chamber and including:
  (a) a feed passageway extending therethrough having an inlet at one end for receiving feed to be treated, an outlet at the other end adapted to be connected to the inlet of the feed passageway of an adjacent header and a discharge port for delivering feed to the casing.
  (b) a filtrate passageway extending therethrough and lying within the feed passageway, the filtrate passageway having a receiving port for receiving filtrate from the media, an outlet at one end for discharging filtrate and an inlet at the other end adapted to be connected to the outlet of the filtrate passageway of an adjacent transfer header.

In yet a further broad form of the invention there is provided a filter cartridge assembly and header comprising:
 i) an elongate tubular casing,
 ii) a replaceable bundle of hollow, porous, polymeric fibres within the casing,
 iii) a plug at one end of the casing in which one end of the bundle of fibres is embedded whereby the plug prevents flow of fluid out of said one end of the bundle of fibres other than through the lumens of the fibres,
 iv) means closing the other end of the casing;
 v) means preventing flow of feed into the other end of the lumens of the bundle of fibres, and
 vi) a transfer header at said one end of said casing and including:
  (a) a feed passageway extending therethrough having an inlet at one end for receiving feed to be treated, an outlet at the other end adapted to be connected to the inlet of the feed passageway of an adjacent header and a discharge port for delivering feed to the casing.
  (b) a filtrate passageway extending therethrough and lying within the feed passageway, the filtrate passageway having a receiving port for receiving filtrate from the fibre lumens, an outlet at one end for discharging filtrate and an inlet at the other end adapted to be connected to the outlet of the filtrate passageway of an adjacent first header.

Preferably the cartridge assembly is adapted for crossflow filtration and as such the means closing the other end of the casing includes a second header at the other end of the casing and said means preventing flow of feed into the ether end of the lumens is replaced by a second plug in which the other end of the bundle of fibres is embedded whereby the second plug permits flow of feed out of the other end of the casing and permits filtrate to be discharged through the fibre lumens at said other end of the bundle of fibres to the second header.

In yet a further broad form of the invention there is provided a transfer header including:
 (a) a feed passageway extending therethrough having an inlet at one end for receiving feed to be treated, an outlet at the other end adapted to be connected to the inlet of the feed passageway of an adjacent header and a discharge port for delivering feed to a casing containing filter media,
 (b) a filtrate passageway extending therethrough and lying within the feed passageway, the filtrate passageway having a receiving port for receiving filtrate from the casing, an outlet at one end for discharging filtrate and an inlet at the other end adapted to be connected to the outlet of the filtrate passageway of an adjacent first header.

Preferably, there is included shut-off means for closing the receiving port without closing the filtrate passageway.

In yet a further broad form of the invention there is provided a filter assembly comprising a plurality of filter cartridge assemblies of the type as described above and further including manifolds for said filter cartridge assemblies for attachment to headers of the type as described above; said manifolds comprising a body having planar opposite ends to facilitate connection to substantially similar adjacent manifolds, a first fluid passageway through the body providing communication from one end of the body to the other so as to permit fluid connection with adjacent manifolds, second and third fluid passageways adapted to be selectively coupled to a passageway of the filter cartridge to provide fluid communication between the cartridge and the filter passageway, the second fluid passageway being located within the third fluid passageway.

In yet a further broad form of the invention there is provided a header assembly for use with filter cartridges arranged in banks; said header including a first passageway lying wholly within a second passageway; said first passageway preventing liquid in said first passageway from mixing with liquid in said second passageway within the confines of said header.

In yet a further broad form of the invention there is provided a filter comprising:
i) a body defining a filter chamber,
ii) it) filter media in the chamber dividing the chamber into a feed side and a filtrate side,
iii) a feed inlet to the chamber and a filtrate outlet from the chamber, and
iv) a transfer header in fluid communication with the chamber and including:
  (a) a feed passageway extending therethrough having an inlet at one end for receiving feed to be treated, an outlet at the other end adapted to be connected to the inlet of the feed passageway of an adjacent header and a discharge port for delivering feed to the casing,
  (b) a filtrate passageway extending therethrough and lying within the feed passageway, the filtrate passageway having a receiving port for receiving filtrate from the fibre lumens, an outlet at one end for discharging filtrate and an inlet at the other end adapted to be connected to the outlet of the filtrate passageway of an adjacent first header.

Preferably the filter is adapted for cross-flow filtration and as such has a header at the other end of the casing and a second plug in which the other end of the bundle of fibres is embedded whereby the plug permits flow of feed out of the other end of the casing and filtrate is discharged through the fibre lumens to the second header.

In yet another broad form of the invention there is provided a filter cartridge assembly and header comprising:
i) an elongated tubular casing,
ii) a bundle of hollow, porous, polymeric fibres within the casing,
iii) a plug at one end of the casing in which one end of the bundle of fibres is embedded whereby the plug prevents flow of fluid out of said one end of the casing other than through the lumens of the fibres,
iv) means closing the other end of the casing,
v) means preventing flow of feed into the other end of the lumens of the bundle of fibres, and
vi) a transfer header at said one end of casing and including:
  (a) a feed passageway extending therethrough having an inlet at one end for receiving feed to be treated, an outlet at the other end adapted to be
  (b) a filtrate passageway extending therethrough and lying within the feed passageway, the filtrate passageway having a receiving port for receiving filtrate from the fibre lumens, an outlet at one end for discharging filtrate and an inlet at the other end adapted to be connected to the outlet of the filtrate passageway of an adjacent first header.

In yet a further broad form of the invention there is provided a transfer header for a filter cartridge including:
(a) a feed passageway extending therethrough having an inlet at one end for receiving feed to be treated, an outlet at the other end adapted to be connected to the inlet of the feed passageway of an adjacent header and a discharge port for delivering feed to the casing,
(b) a filtrate passageway extending therethrough and lying within the feed passageway, the filtrate passageway having a receiving port for receiving filtrate from the fibre lumens, an outlet at one end for discharging filtrate and an inlet at the other end adapted to be connected to the outlet of the filtrate passageway of an adjacent first header, and
(c) shut-off means for closing the receiving port without closing the filtrate passageway.

In yet another broad form of the invention there is provided a manifold for a filter cartridge assembly comprising a body having planar opposite ends to facilitate connection to substantially similar adjacent manifolds, a first fluid passageway through the body providing communication from one end of the body to the other so as to permit fluid connection with adjacent manifolds, second and third fluid passageways adapted to be selectively coupled to a passageway of the transfer header to provide fluid communication between the cartridge and the filter passageway, the second fluid passageway being located within the third fluid passageway In yet a further broad form of the invention there is provided a filter cartridge assembly of the type adapted to conduct feed and filtrate independently and simultaneously into and out of either end of the cartridge structure; said cartridge structure comprising opposed first and second headers at either end of said structure mechanically connected to and in fluid communication with a filter cartridge disposed therebetween; said filter cartridge assembly comprising an outer body inside which is located a body of filter media; said filter media incorporating end portions adapted to be constrained against longitudinal movement along the longitudinal axis of said cartridge structure.

In yet a further broad form of the invention there is provided a replaceable microporous filter bundle for a double ended filter of the type where, in use, both feed and filtrate can be independently and simultaneously ducted into and out of either end or both ends of the cartridge in which said bundle is located; said bundle comprising an elongate filter medium retained in respective first and second end housings; said end housings incorporating means adapted to allow anchoring of said first and second end housings against longitudinal movement along the longitudinal axis of said cartridge.

Preferably said means adapted to allow anchoring comprises first and second spaced apart ridges encircling the periphery of said end housings engageable against respective opposed shoulders of an encircling clip; a first one of said opposed shoulders mechanically supported against a sleeve member which in turn is mechanically supported on a header member; a second one of said opposed shoulders mechanically urged against a first end of a slidable cup member which is sealingly slidable over said end housings and is, in turn, urged into sealing engagement with said header member.

In yet a further broad form of the invention there is provided, in a microporous filter assembly comprising a plurality of detachably interconnected filter cartridge assemblies; a valve structure adapted to be located in a head end portion of ones of said filter cartridge assemblies whereby feed to or filtrate from said ones of said filter cartridge assemblies can be independently isolfated from the feed or filtrate to which others of said filter cartridge assemblies are exposed.

BRIEF DESCRIPTION OF THE DRAWINGS

In order that the invention may be more readily understood and put into practical effect, reference will now be made to the accompanying drawings in which.

BRIEF DESCRIPTION OF PREFERRED EMBODIMENTS

The improved microporous filter assembly of the invention comprises a number of important aspects. The more important of these are the replaceable filter media cartridge, its enclosure and the method by which the enclosure works in conjunction with the filter media cartridge to define a chamber on either side of the media, each chamber being separately ducted into a header; the header itself which has a symmetrical structure permitted in part because of the concept of a duct entirely encased within an outer duct; a symmetrical manifold structure which, as for the header, utilises a duct within a duct structure; a shutoff valve mechanism which is both visible and actuatable from the exterior of the header and operates upon the header so as to either isolate or permit flow of fluid from the inner chamber of the media cartridge to reach the header.

Each of these innovations is important and should be considered both in isolation as well as contributing features which each work together with the others to create an improved modular filter structure.

Filter Media Cartridge and its Enclosure

Figure 2:
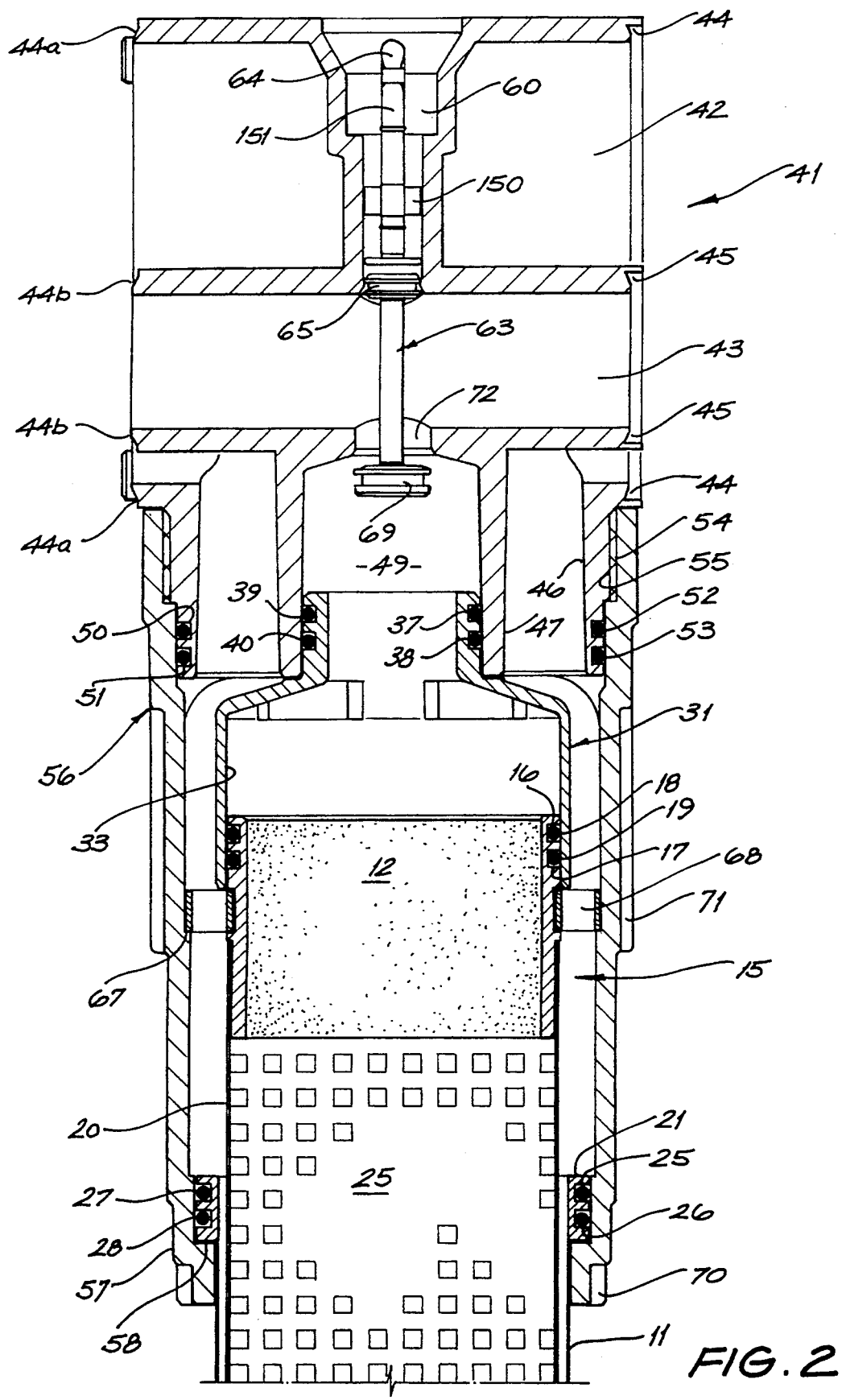
FIG. 2 is a partly broken away sectional view of the top portion of the cartridge shown in FIG. 1.
Figure 3:
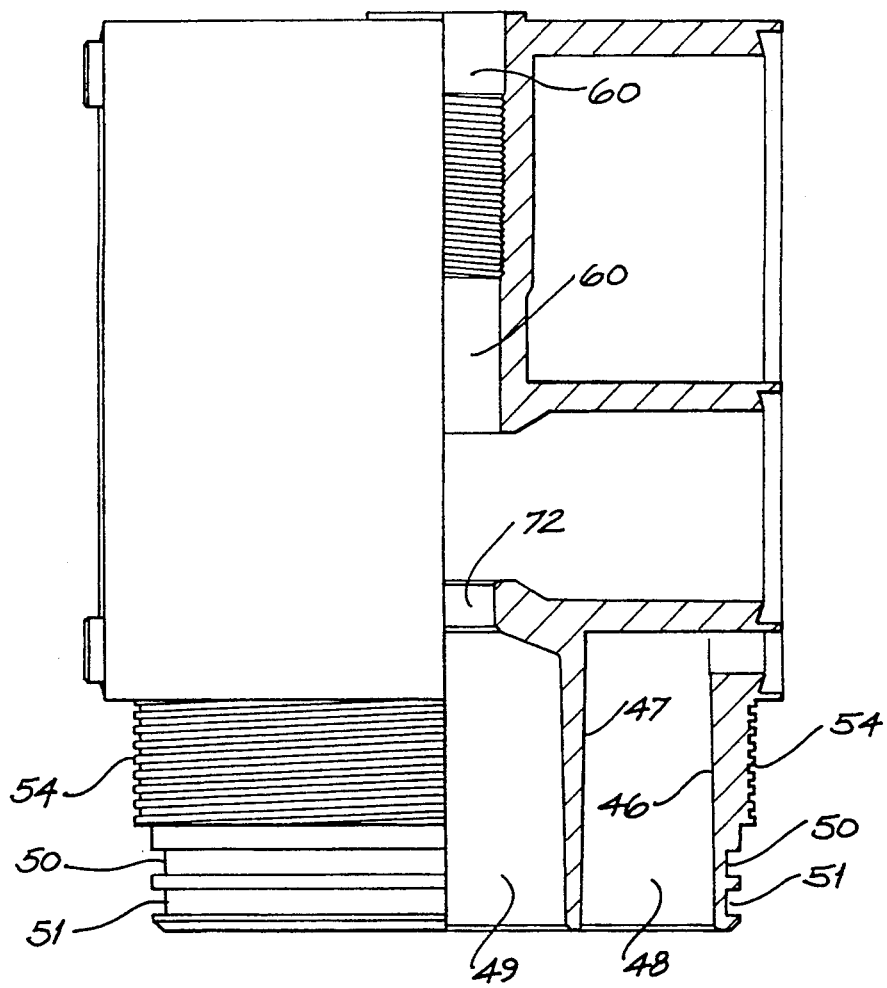
FIG. 3 is an enlarged half sectional view of the filter cartridge shown in FIG. 1.
Figure 4:
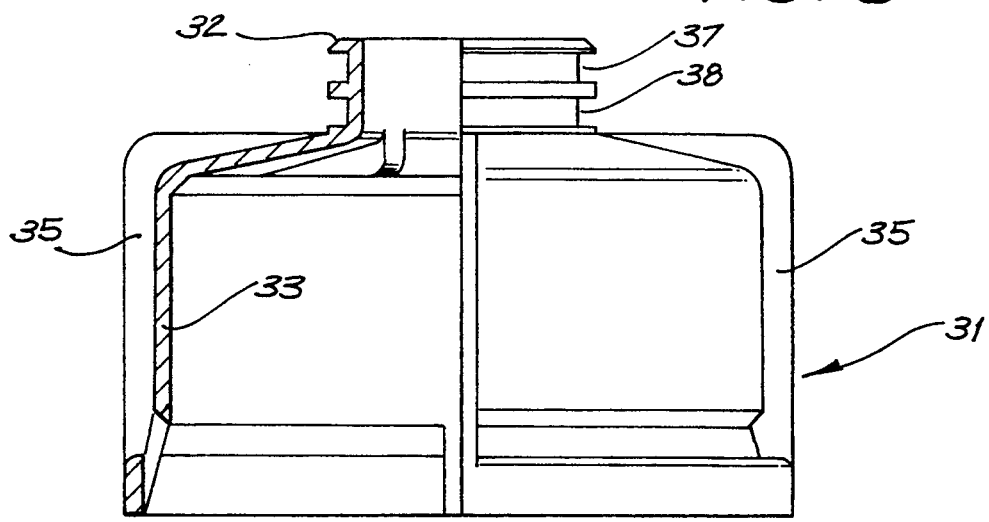
FIG. 4 is an enlarged half sectional view of the filtrate sleeve of the filter cartridge shown in FIG. 1.

As best seen in FIG. 2 the filter media cartridge is adapted to be replaceable by a sideways movement of the cartridge and its associated enclosing assembly whereby the upper and lower header assemblies need not be disturbed or dismantled.

The salient components of the filter media cartridge are the filter media itself which comprises a bundle of microporous hollow fibres terminating in opposed ends 14 embedded in a polyurethane plug 12. The plug 12 is, itself, encased in an end piece or cap or cage 15 which serves as a former for the polyurethane plug during manufacture and serves to provide external working surfaces which are used to support the fibre bundle in use so that it will resist both the extending forces encountered during normal filtration and the compressive forces encountered during backwash.

Particularly the cage 15 includes a pair of grooves 16, 17 for receiving O-rings 18, 19 which form a slidable seal against an inner surface of connecting flange 33 of filtrate cup or housing 31. The structure of the connecting flange 33 is such that the filtrate cup 31 can be slid downwardly onto the cage 15 (when annular clip 68 is removed) to the extent that the upper end of the filtrate cup entirely clears internal skirt or flange 47 of the header 41.

In order to remove the clip 68 it is necessary first to disengage and slide downwardly outer sleeve 56 to the extent that the sleeve is drawn below the level of the clip 68. The clip 68 is made in two halves thereby allowing the clip to be disengaged from the groove 26 in the cage 15 in which it normally resides thereby allowing the filtrate cup to be drawn downwardly as described above.

When these clearing actions are performed on the filtrate cup, clip and outer sleeve located at both ends of the cartridge then the entire cartridge complete with casing 11 and sleeves 56 can be slid sideways with respect to its longitudinal axis so as to be lifted clear of the header assemblies without disturbing the header assemblies themselves. A reverse process is followed to replace the filter cartridge and filter cartridge assembly.

Whilst this arrangement can be used with single ended filter cartridges it is most useful with, the double ended opposed header arrangement shown in the figures where it is simply not possible to remove the filter cartridge without disturbing the header assemblies without compacting the filter cartridge and filter cartridge assembly in some manner along their longitudinal axes.

The clip 68 includes longitudinal ducts passing therethrough for the purpose of permitting fluid communication between the outside of the filter bundle and the cavity defined (in use) between the outside of the filtrate cup 31 and the inside of the upper region of the sleeve 56.

The arrangement described also provides support for the cage 15 in both an upward and a downward, longitudinal direction whereby the cage 15 (and hence the opposed ends 14) of the fibre bundle resist the compressive forces exerted during backwash and extensive forces exerted during normal filtration. This support is provided without the necessity of using any form of internal stiffening integral to the filter cartridge itself. Rather the mechanical support is provided by reliance on the filter cartridge casing and associated header assemblies.

Header and Header Interconnection

As most succinctly seen if FIG. 2 the header 41 is adapted to permit the passage independently of two fluids.

A dominant feature of the header 41 is that it is predominantly symmetrical about planes which have the longitudinal axis of the filter cartridge assembly lying upon them, particularly the plane which passes at right angles to the predominant direction of flow of both feed and filtrate within the header 41 and the plane which is at right angles to that plane. This is to be contrasted with the offset arrangement of the header disclosed in PCT/AU87/00309. The symmetrical arrangement allows a greater packing density of cartridges than would otherwise be the case.

The symmetry has been particularly achieved by enclosing the filtrate discharge passageway 43 entirely within the feedstock inlet passageway 42 within the header 41.

Each header 41 can be abutted against a like header so as to create a row of headers to which a row of cartridges can be connected. In the preferred arrangement a corresponding row of like headers 41 is attached to the opposite end of each cartridge so as to form a double ended, symmetrical row of cartridges with the capability of passing both feed and filtrate into and out of each header at each end of each cartridge.

This arrangement is particularly suited to facilitate cleaning of the filter medium by blowback as an automated process forming an integral part of the filtration method.

Manifolds and Manifold Interconnection

Feed inlet manifold 100 an feed outlet manifold 101 both comprise a block shaped structure having one pair of opposed, generally parallel faces bridging which is a large, generally circular passageway. The structure of the manifolds includes two additional passageways adapted to communicate between the main passageway and a third face of the manifolds. These two passageways have two important characteristics: firstly one of the additional passageways is enclosed entirely within the second additional passageway, and secondly in each manifold one of the two additional passageways is blanked off from the main passageway. Which of the two additional passageways is to be blocked off is determined by whether the manifold is to be used as a feed inlet or a feed outlet manifold.

Utilisation of the passageway within a passageway concept allows these manifolds to be used to connect two rows of headers 41 for the purpose of paralleling feed into rows of cartridges and paralleling the removal of filtrate from rows of cartridges and also for the purpose of connecting such groups of interconnected rows in series with each other. The nature of the flow of feed and filtrate within and between the manifolds is generally the same as disclosed in PCT/AU90/00470.

Filtrate Shutoff Valves

The filtrate shutoff valve structure 63 provides for selective obstruction of the path between the inner side of the filter medium and the filtrate discharge passageway 43 so as to prevent fluid coming from a damaged filter cartridge from passing into the filtrate discharge passageway 43.

The upper stem of the valve is constructed so as to make it clear to an observer of an assembled array of filter cartridges as to whether the valve is in the open or closed position.

The valve allows the isolation of the contribution from selected filter cartridges in a simple and straight forward manner. More particularly this allows such selective isolation whilst leaving the filter bank on line so that the contribution from other (non-isolated) filter cartridges is not disturbed.

Figure 5:
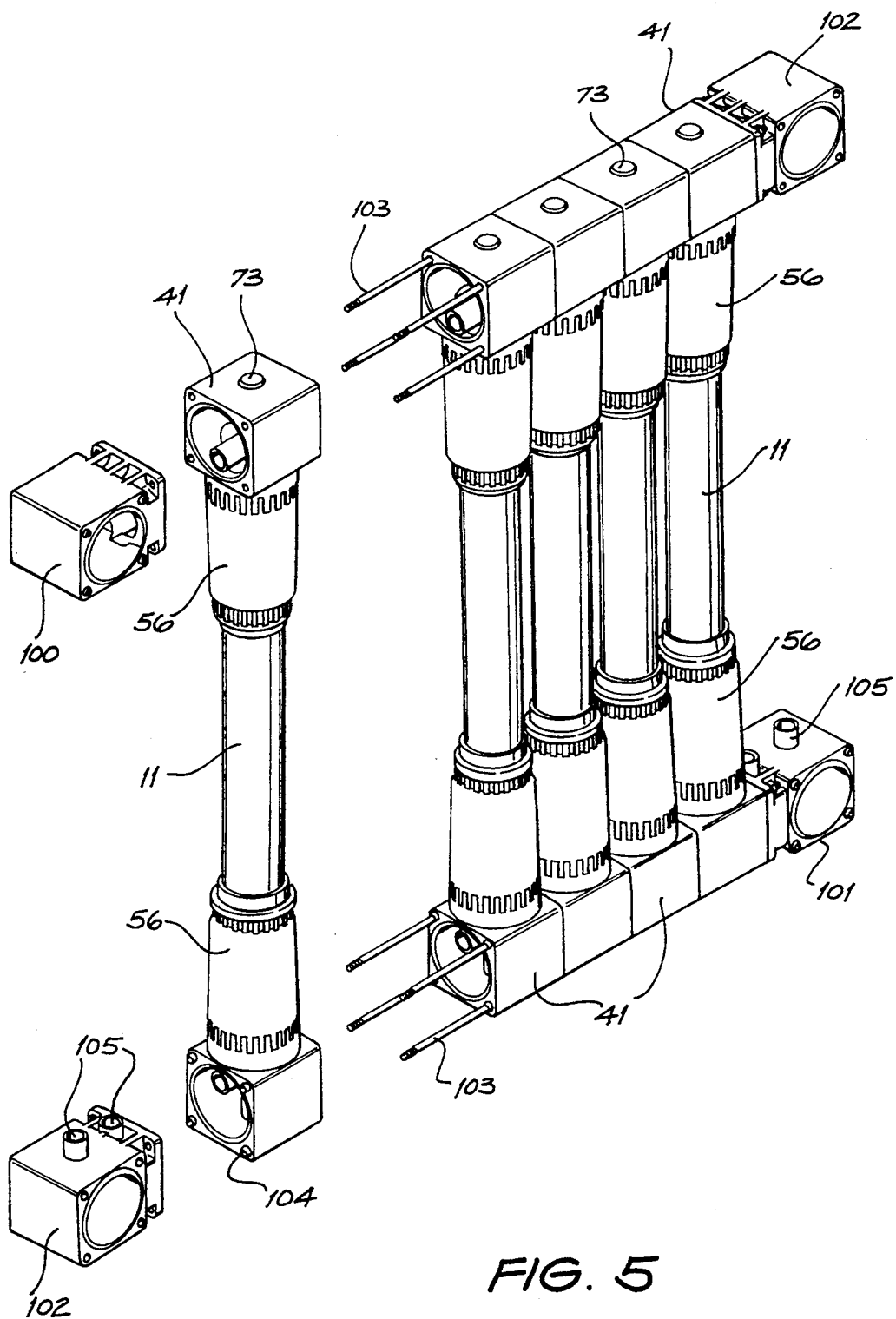
FIG. 5 is a partly exploded perspective view of a row of filter cartridges shown in FIG. 1.
Figure 6:
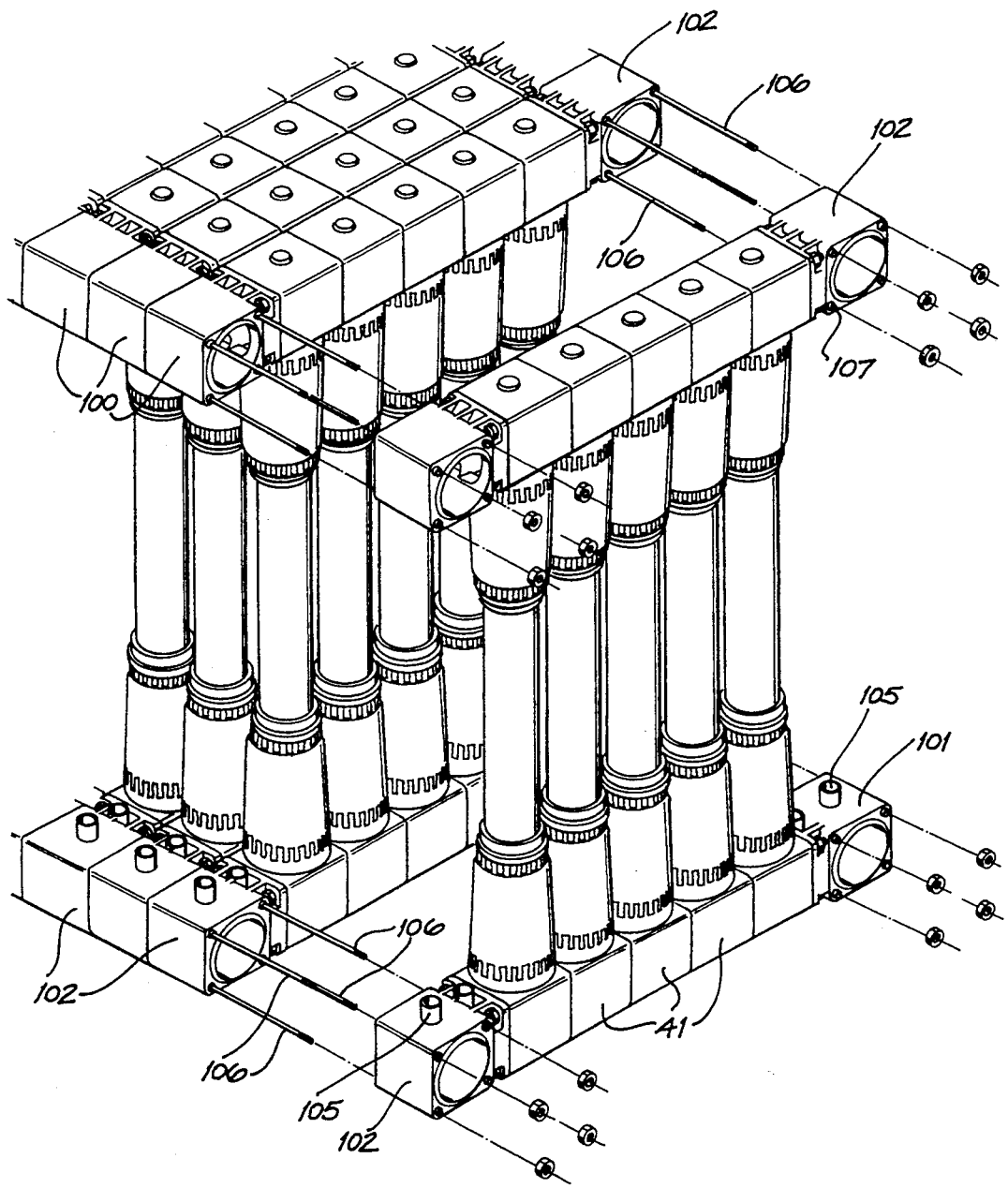
FIG. 6 is a partly exploded perspective view of a bank of filter cartridges shown in FIG. 5.

A replaceable filter cartridge of a first embodiment will now be described with reference to a bank of filter cartridges as generally shown in FIGS. 5 and 6. These figures show the use of a manifold arrangement comprising a large diameter tube adapted to carry liquid to be filtered, which tube wholly contains a small diameter tube adapted to received and carry liquid that has been filtered. The replaceable cartridge concept of this invention can be used with this form of manifold arrangement. It should be understood that the replaceable cartridges of both the first and second embodiments of this invention can be used with other forms of manifold arrangement (for example as disclosed in PCT/AU87/00309) as well. Equally the tube within a tube concept as used in the headers and manifolds can be used independently of the other features described. Again, the filtrate shutoff valves can be utilised and applied independently of the other features.

First Embodiment

Figure 1:
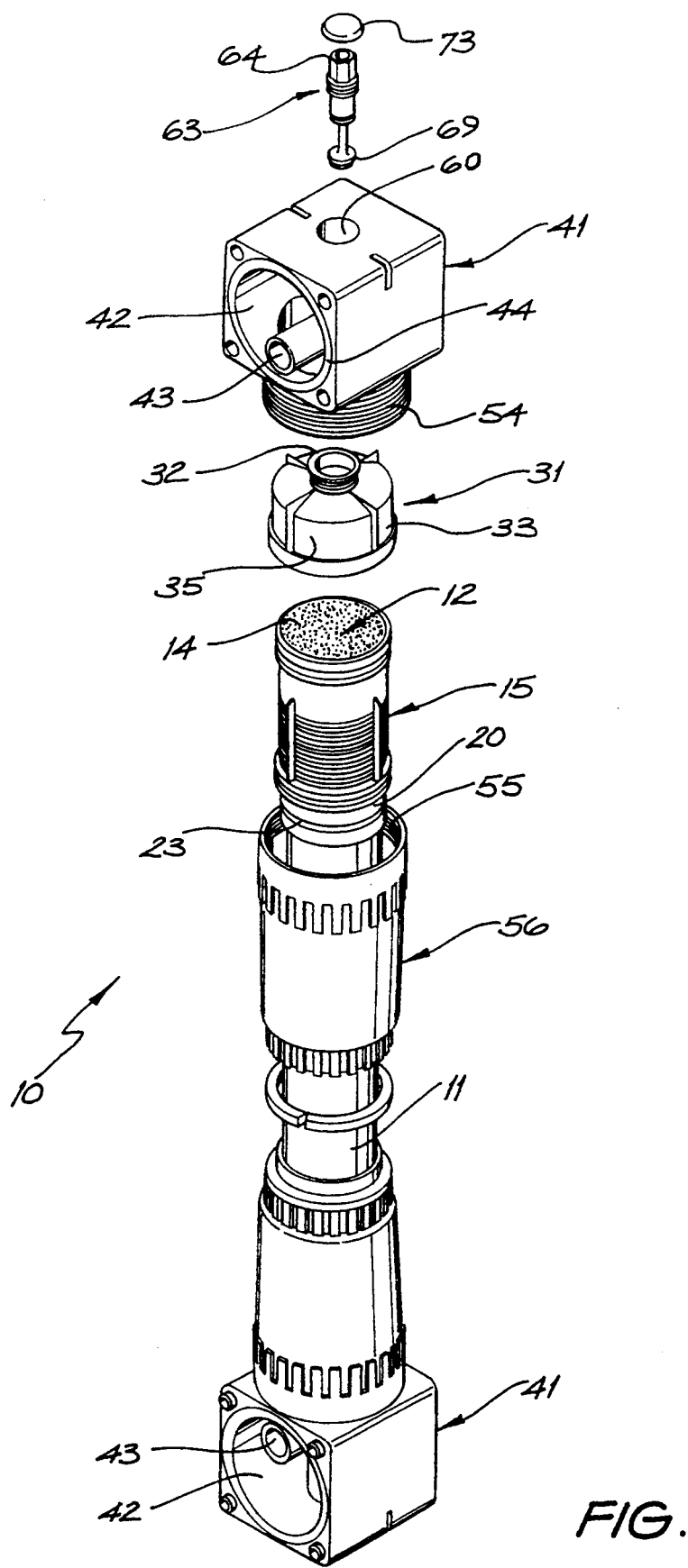
FIG. 1 is an exploded perspective view of a filter cartridge assembly according to a first embodiment of the invention.

The filter cartridge assembly 10 shown in FIG. 1 includes a tubular casing 11 that encloses a bundle of hollow, porous, polymeric fibres. The bundle of fibres forms the working part of a filter cartridge 25 comprising the bundle together with end caps or cages 15. In this instance, each fibre, which is made of polypropylene, has an average pore size of 0.2 micron, a wall thickness of 200 microns and a lumen diameter of 200 microns. There are 12,000 hollow fibres in the bundle, but this number, as well as the individual fibre dimensions, may be varied according to operational requirements. The upper ends 14 of the fibres are embedded in a polyurethane plug 12 that is cast into an end-piece or potting cage 15. Around the periphery of the upper end of the end-piece or cage 15 there is a pair of grooves 16 and 17 for receiving O-rings 18 and 19 respectively. The lower end of the end-piece or cage 15 receives a perforated cylindrical screen 20 which encloses the fibres.

The upper portion 23 of the tubular casing 11 with the end 21 of the casing 11 has an outer sleeve 22 which has a pair of grooves 25 and 26 which support O-rings 27 and 28 respectively.

In this instance, there is a similar end piece or cage (not shown) at the bottom of the tubular casing 11 but such need not be the case if the filter is to be constructed to run in a dead-end mode. In the case of a dead-end mode filter, the lower ends of the fibres may be sealed with or without being embedded in a polyurethane plug.

Mounted on the upper end of the end-piece 15 there is a filtrate cup or housing 31 having a neck or outlet portion 32 and a connecting flange 33, the inner face of which seals against the O-rings 18 and 19. Around the periphery of the neck portion 32 there is a pair of annular grooves 37 and 38 which support O-rings 39 and 40.

The filtrate cup or housing 31 provides an outlet path for the filtrate which is discharged from the open ends 14 of the fibres embedded in the plug 12.

At the top of the filter cartridge 10 there is a combined feedstock/filtrate header 41 which has a large feedstock inlet passageway 42 therethrough and a smaller filtrate discharge passageway 43 therethrough. The header 41 has planar side faces and at one side of the header 41 there are grooves 44 and 45 for receiving O-rings around the ends of the passageways 42 and 43 and at the opposite side of the header 41 there are annular bevelled projections 44a and 44b adapted to engage the O-rings of an adjacent header 41.

The header 41 has a pair of downwardly extending connection flanges 46 and 47 which respectively define feedstock passageway 48 providing communication between the feedstock passageways 42 and 35 and filtrate passageway 49 providing communication between the outlet 32 of the filtrate sleeve 31 and the filtrate discharge passageway 43.

The base of the flange 47 sealingly engages the O-rings 39 and 40 around the neck portion of the filtrate sleeve 31 and at the base of the flange 46 there are annular grooves 50 and 51 which support O-rings 52 and 53 respectively. On the outer face of the flange 48 there is a threaded portion 54 for receiving a correspondingly threaded portion 55 of an outer connecting sleeve 56.

Figure 14:
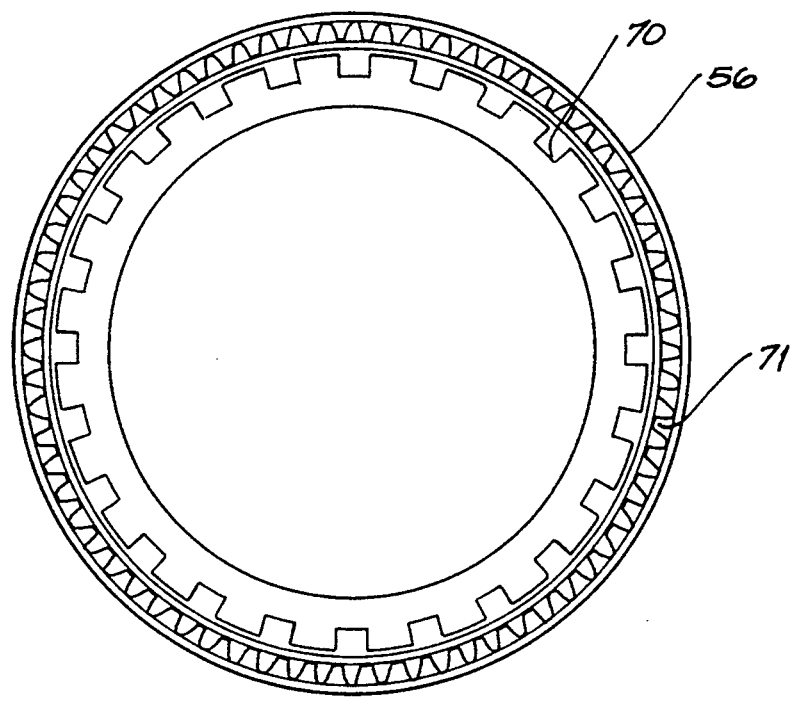
FIG. 14 is an end elevational view of the connecting sleeve shown in FIG. 1

The connecting sleeve 56 constitutes a boundary for the feedstock passageway 35 and at its lower end there is a neck portion 57 having an inwardly directed shoulder 58 which engages the lower edge of sleeve 22 on the casing 11. Rotation of the outer sleeve 56 to achieve threaded engagement with, or disengagement from, the skirt or flange 46 is facilitated by the presence of profiled regions 70 and 71 around the respective perimeters of the outer sleeve 56, as indicated in FIG. 2. In this instance, region 71 has a gear-tooth profile, suitable for engagement with a motorised drive, and region 70 has a castellated profile, suitable for alternative engagement with a C-spanner—see FIG. 14.

An internal shoulder region 67 on the inner surface of outer sleeve 56 engages with an annular clip 68 which fits around the potting cage 15 at the end of the perforated screen 20 and butts against the end of the filtrate cup 31 such that, when the outer sleeve 56 is fully engaged with the skirt or flange 46, the minor end of the filtrate cup 31 is fully inserted within the internal skirt or flange 47 of the header 41.

If the need arises to remove or replace the fibre bundle, together with perforated screen surround and potted ends, this can be done without disturbing the head pieces when assembled in a filter bank or filter array. After unscrewing the outer sleeve 56 from the head piece skirt 41, the outer sleeve 56 is slid along casing 11 towards the centre of the cartridge (together with annular clip 68 or after splitting clip 68 into its constituent halves) thus permitting the filtrate cup to be drawn back over the potting sleeve for a sufficient distance to extract the minor end of the filtrate cup from the head piece internal skirt, thereby permitting subsequent removal of the filter bundle.

Replacement of a fibre bundle involves following the above described procedure in reverse order.

A shut-off passageway 60 in the header 41 provides access from the exterior of the header 41 to the interior of the filtrate discharge passageway 43 and houses a shut-off spool or valve 63. The top portion 64 of the shut-off spool 63 has an aperture for receiving an adjustment tool (not shown) and for manual activation of the spool. Adjacent the central portion of the shut-off spool 63 is a seal 65 which provides a seal between the shut-off spool 63 and the shut-off passageway 60.

At the lower end of the shut-off spool 68 there is a seal 69. When the shut-off spool 63 is moved upwardly, the seat 69 closes the port 72 to the filtrate discharge passageway 43 to prevent flow of filtrate from the cartridge 10 to the header 41. It is to be noted, however, that closure of the port 72 does not interfere with the flow of filtrate from and to adjacent headers through the filtrate passageway 43. A plug 73 on the top of header 41 closes off the cut-off passageway 60. The valve 63 is so designed that it can be readily operated without resort to any dismantling of component parts of the filter.

In a particular embodiment of the spool arrangement, the plug 73 cannot be replaced when the spool is in the "up" postion. This provides visual indication, easily ascertainable at a distance, that the spool is shut off implying that the cartridge which it feeds is disconnected from feed.

The spool 63 is moved from the open position to the closed position (refer FIG. 2) by firstly rotating valve shaft 63 through 90°, thereby allowing rectangular block component 150 (mounted on valve shaft 63) to pass through a corresponding rectangular aperture 151 when the valve shaft 63 is lifted. Once the valve shaft is in the fully up position the shaft is rotated back through 90° once more so that inadvertent lowering of the shaft is prevented by the interaction of blocking piece 150 with the top of cut off passageway housing 60. The shutoff spool is opened by a reversal of the procedure.

As indicated in FIG. 1, the bottom of the cartridge 10 is similar to the top in that it has a header 41 and a connecting sleeve 56. The filter cartridge 10 could be simply modified to provide for a dead-end mode of operation.

FIG. 5 shows a row of filter cartridges 10 connected together in parallel and having a feed inlet manifold 100, a concentrated feed outlet manifold 101 and filtrate manifolds 120. The row of cartridges 10 are connected together by tie bars 103 which pass through apertures 104 in the header 41. Sample or dosing ports 105 may be provided in the manifolds 100, 101 and 102. FIG. 6 shows a plurality of rows of cartridges connected together through adjacent manifolds 100, 101 and 102 to form a bank of filter cartridges which are held together by tie bars 106 which pass through apertures 107 in the manifolds 100, 101 and 102.

Figure 7:
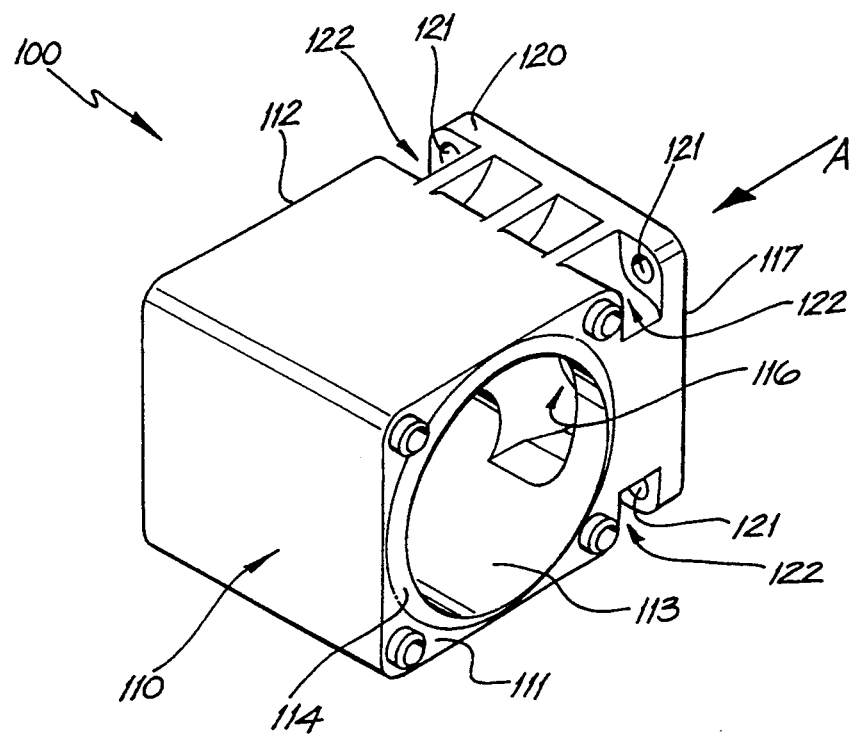
FIG. 7 is a perspective view of the feed manifold shown in FIGS. 5 and 6.
Figure 8:
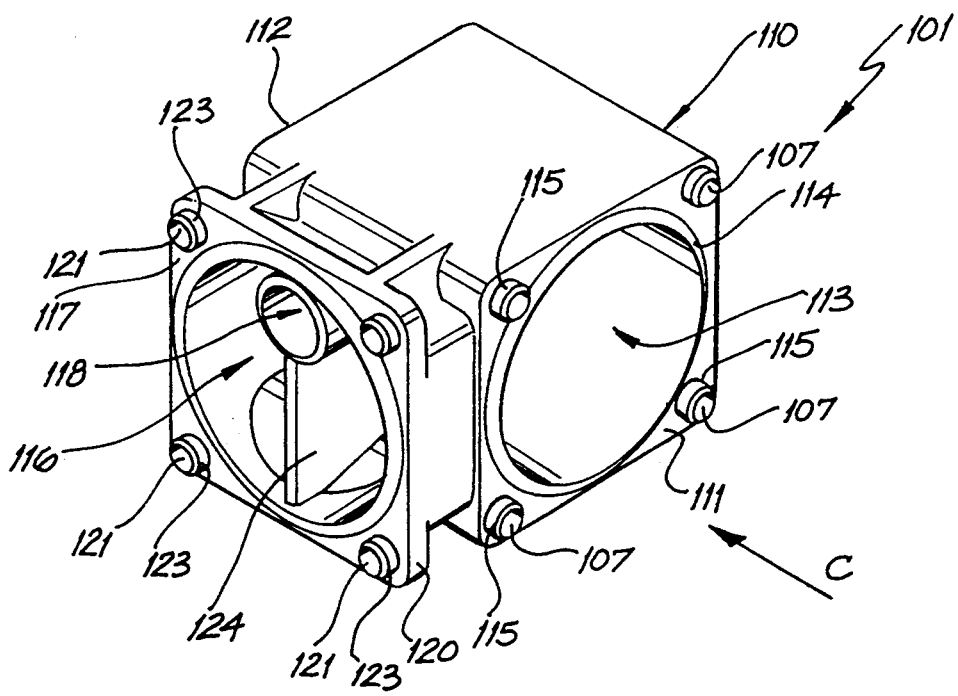
FIG. 8 is an inverted perspective view of the feed manifold shown in FIG. 7.
Figure 9:
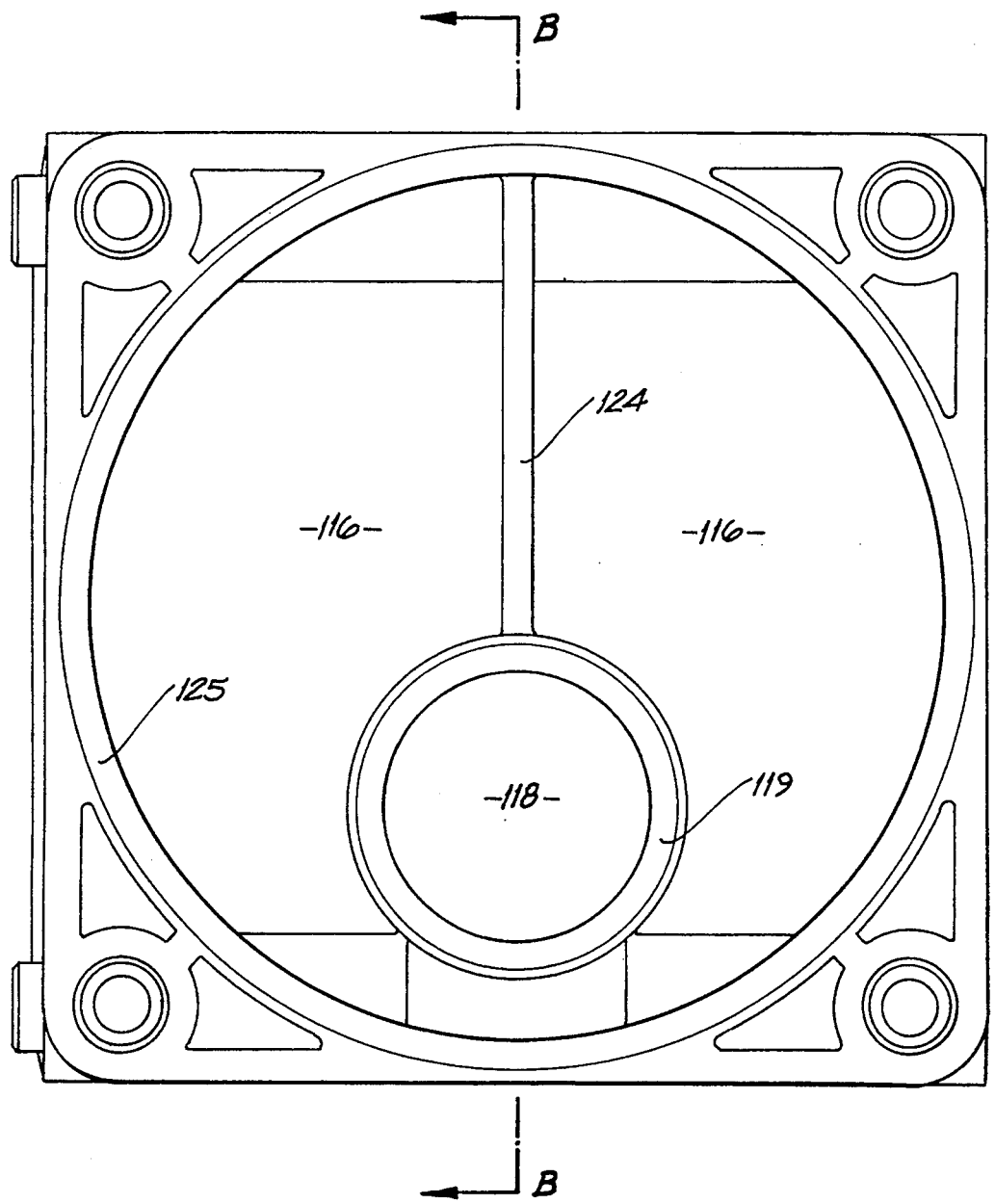
FIG. 9 is an elevational view taken in the direction of arrow A in FIG. 7.
Figure 10:
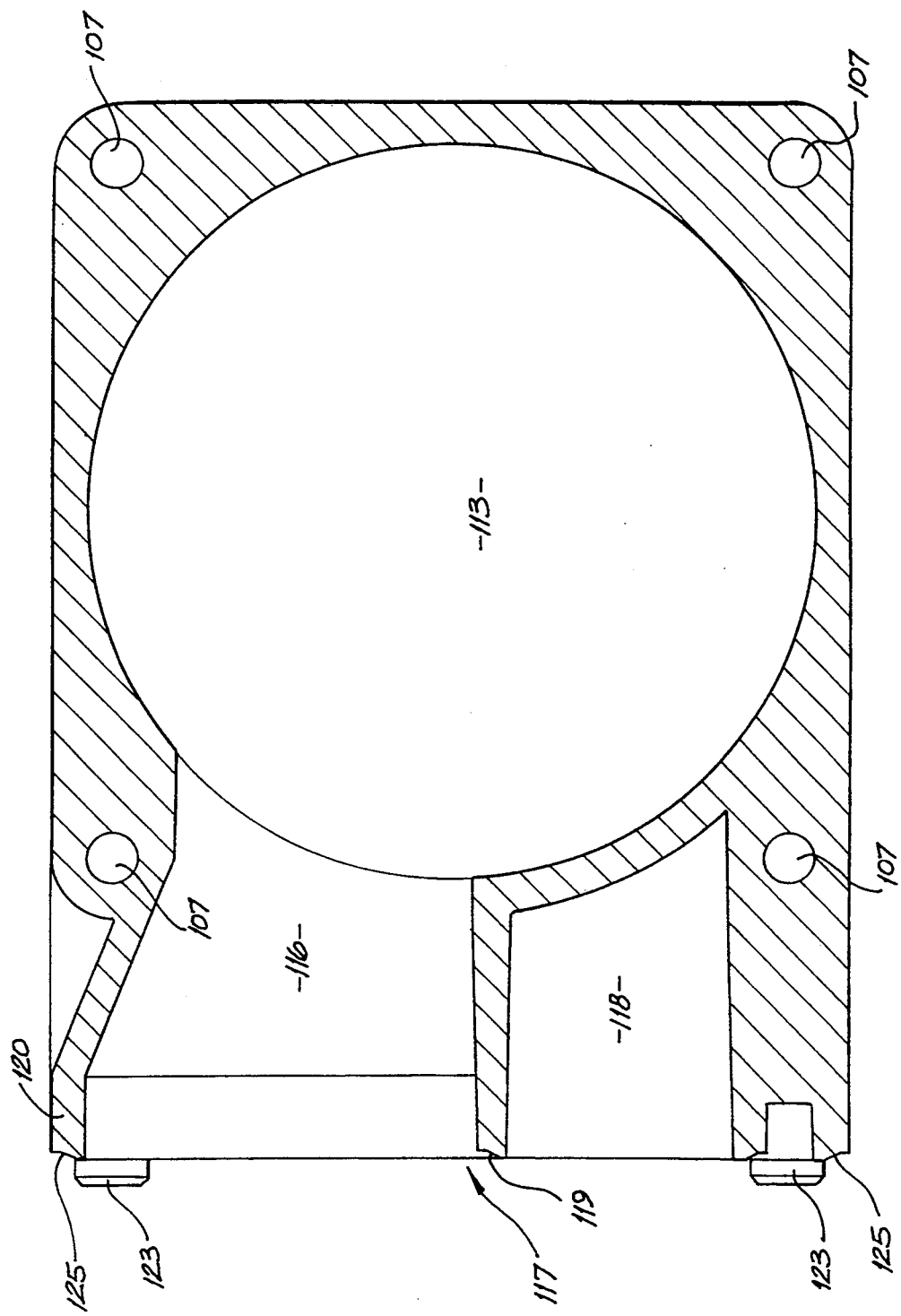
FIG. 10 is a view taken in the direction of arrows B—B in FIG. 9.
Figure 11:
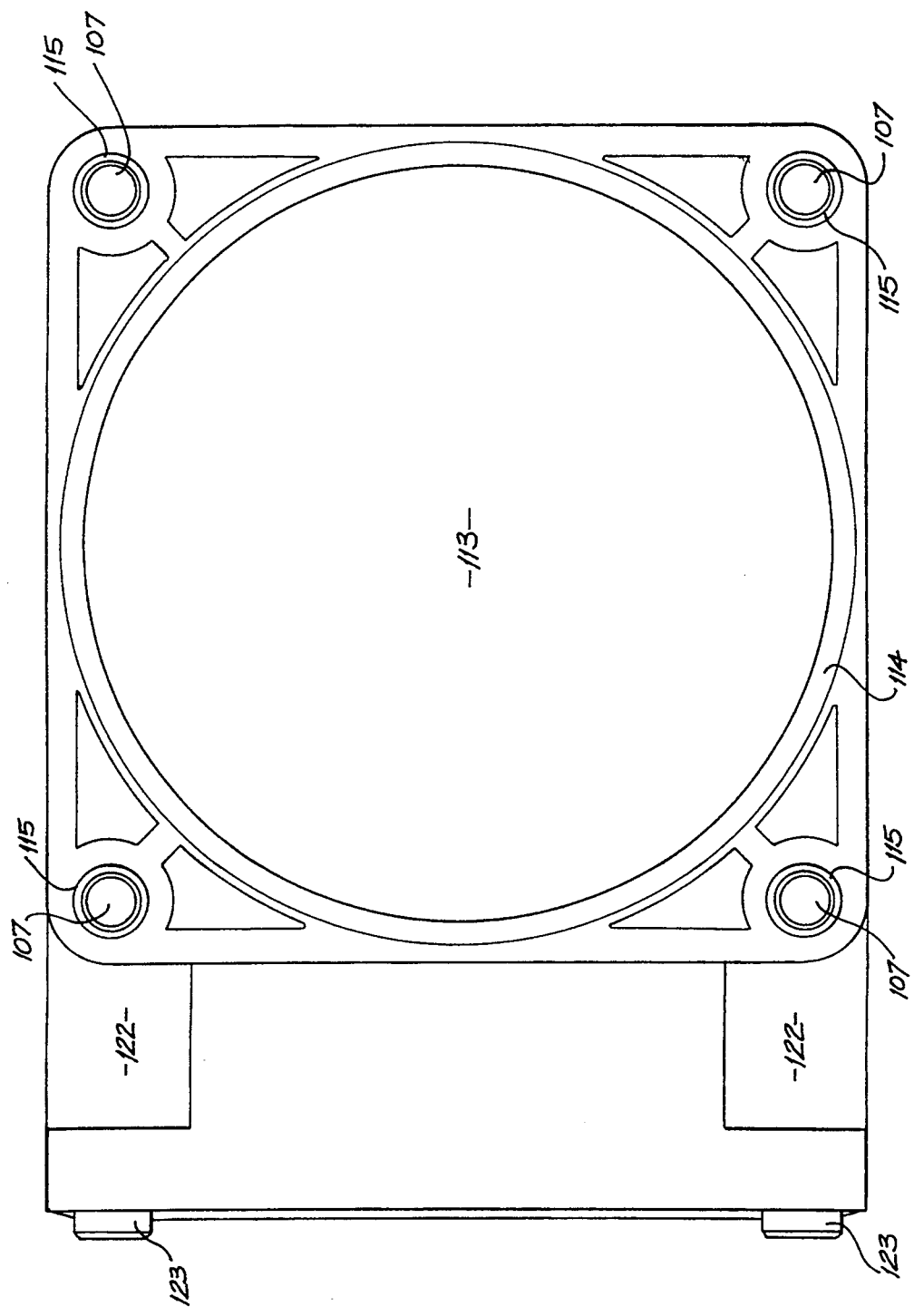
FIG. 11 is an elevational view taken in the direction of arrow C of FIG. 8.

The feed manifolds 100 and 101 are of the same shape and configuration and are shown in detail in FIGS. 7 to 11. FIG. 7 depicts the feed inlet manifold 100 and FIG. 8 depicts the feed outlet manifold 101 but it is to be understood that the manifolds are of the same construction with the feed outlet manifold 101 of FIG. 8 being inverted with respect to the feed inlet manifold 100 of FIG. 7. The manifolds 100 and 101 include a body portion 110 having plan end faces 111 and 112 which facilitate connection to an adjacent similar manifold.

The body portion 110 defines a feed passageway 113 which extends through the body from end face 111 to end face 112. Around the opening to the passageway 113 in face 112 there is an annular recess (not shown) for receiving an O-ring and around the opening to the passageway 113 and end face 111 there is a bevelled annular projection 114 adapted to engage an O-ring of an adjacent manifold.

Around the tie bar apertures 107 in end face 111 there are annular locating dowels 115 which engage corresponding recesses (not shown) around the tie bar apertures 107 in the end face 112 of an adjacent manifold.

As can be seen if FIGS. 7 and 8, the feed passageway 113 has a transverse branch passageway 116 which leads to face 117 of the manifolds 100 and 101 to provide feed communication between the feed passageway 113 and the feed passageway 42 of the header 41. A bevelled annular projection 125 around the periphery of the passageway 116 engages an O-ring around passageway 42 of header 41.

The manifolds 100 and 101 have a third or blind passageway 118 within the feed passageway 116 which is supported by a rib 124. The blind passageway 118 has a bevelled annular projection 119 around its periphery to engage the O-ring around the filtrate passageway 43 of the header 41. The flange 120 which defines face 117 has apertures 121 for receiving the tie bars 103 which are secured by nuts (not shown) located in recesses 122. Around the apertures 121 there are locating dowels 123 adapted to engage corresponding recesses in the header 41.

Figure 12:
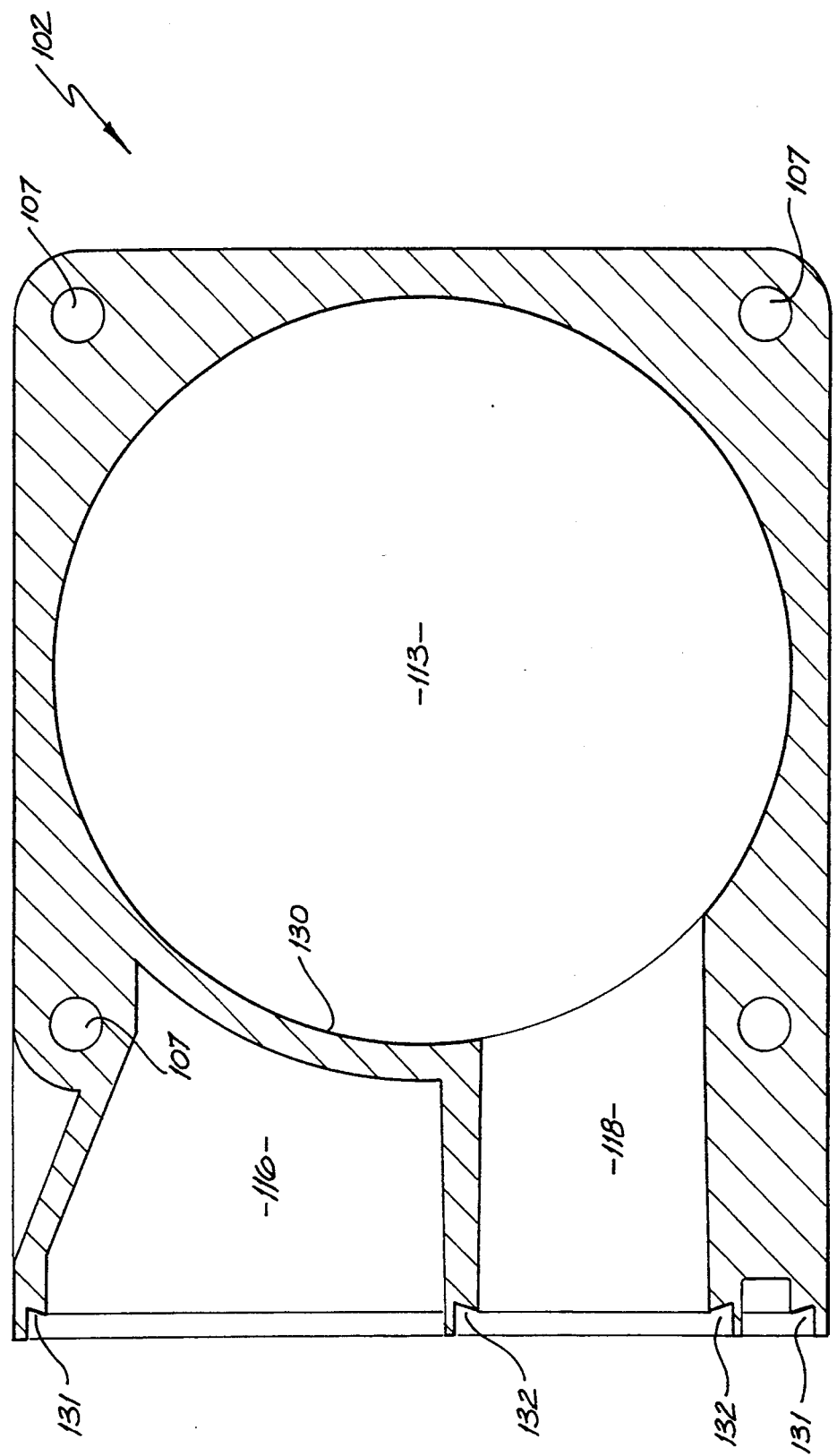
FIG. 12 is a view similar to FIG. 10 showing the filtrate manifold

The filtrate manifold 102 shown in FIG. 12, is, in most respects, the same as the feed manifolds 100 and 101 shown in FIGS. 7 to 11. The major difference is that the feed passageway 106 is closed by wall 130 and filtrate passageway 118 is open to provide communication with the filtrate passageway 43 of header 41. As the filtrate manifold is connected to the other end of the row of cartridges 10, there are annular recesses 131 and 132 around the passageways 106 and 118 respectively for receiving O-rings (not shown). The passageway 113 is, of course, now a filtrate passageway.

Figure 13:
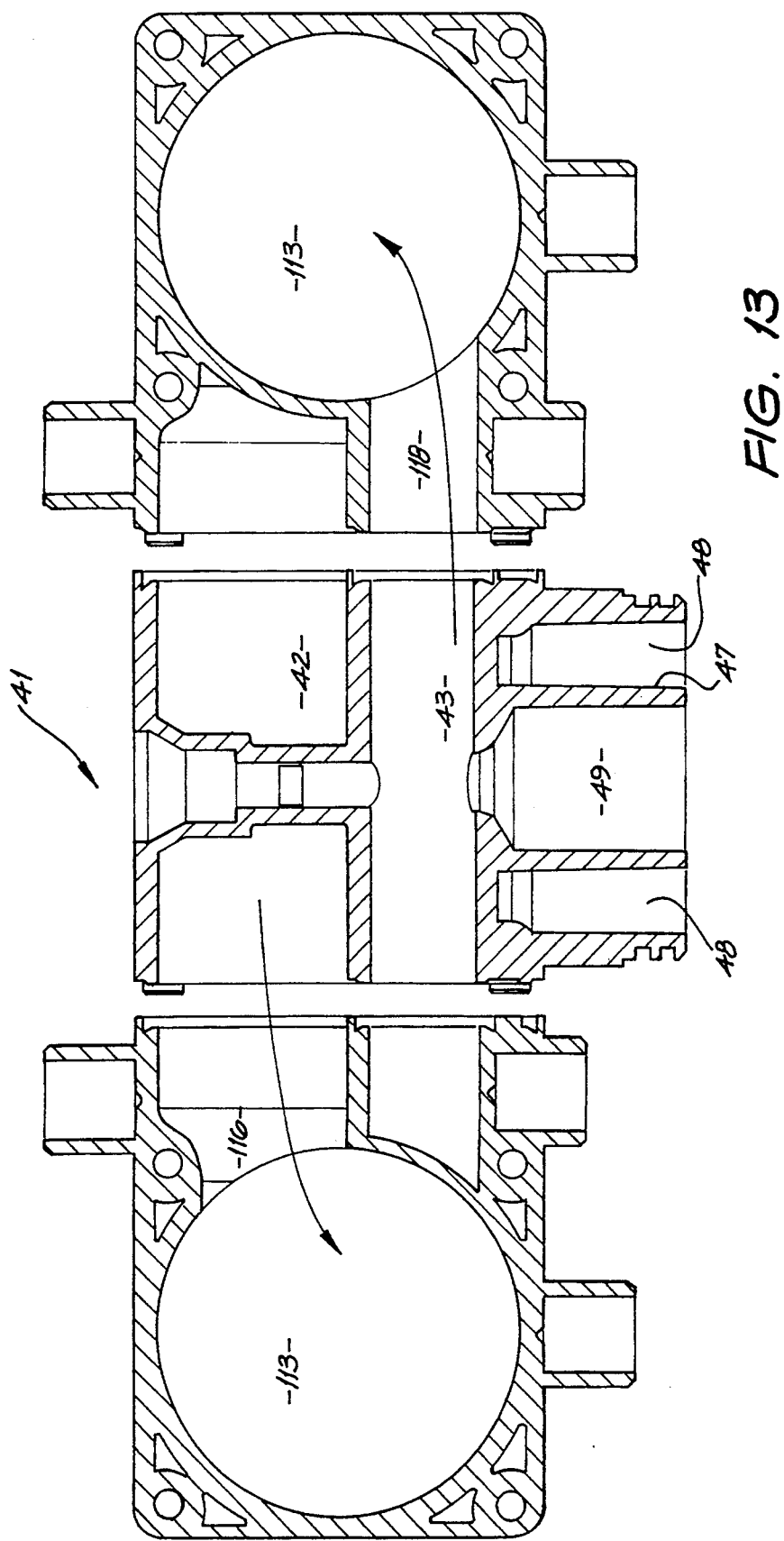
FIG. 13 is an exploded cross-sectional view of one header with adjacent manifolds on either side of the header.

FIG. 13 is an exploded cross-sectional view of a head piece moulding with a feed manifold on one side and a filtrate manifold on the other side, indicating the flows from the feed passageway and filtrate passageway into the respective manifolds.

Second Embodiment

FIGS. 15 to 20 inclusive show details of a second embodiment of the replaceable filter cartridge. In principle the operation of the cartridge of the second embodiment is the same as the first embodiment.

Figure 15:
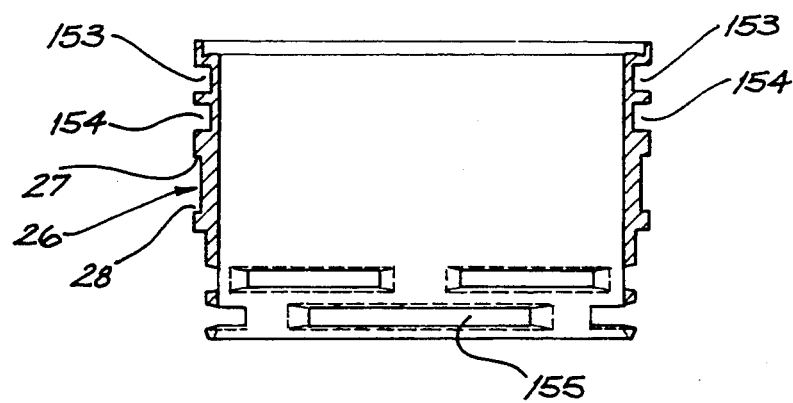
FIG. 15 shows a potting cage of a second embodiment.

Referring to FIG. 15 the potting cage 15 includes grooves 153, 154 adapted to receive sealing rings. The open vent structure 155 comprises elongate, relatively wide slots which can be contrasted with the relatively narrow slot configuration of the first embodiment.

Figure 16:
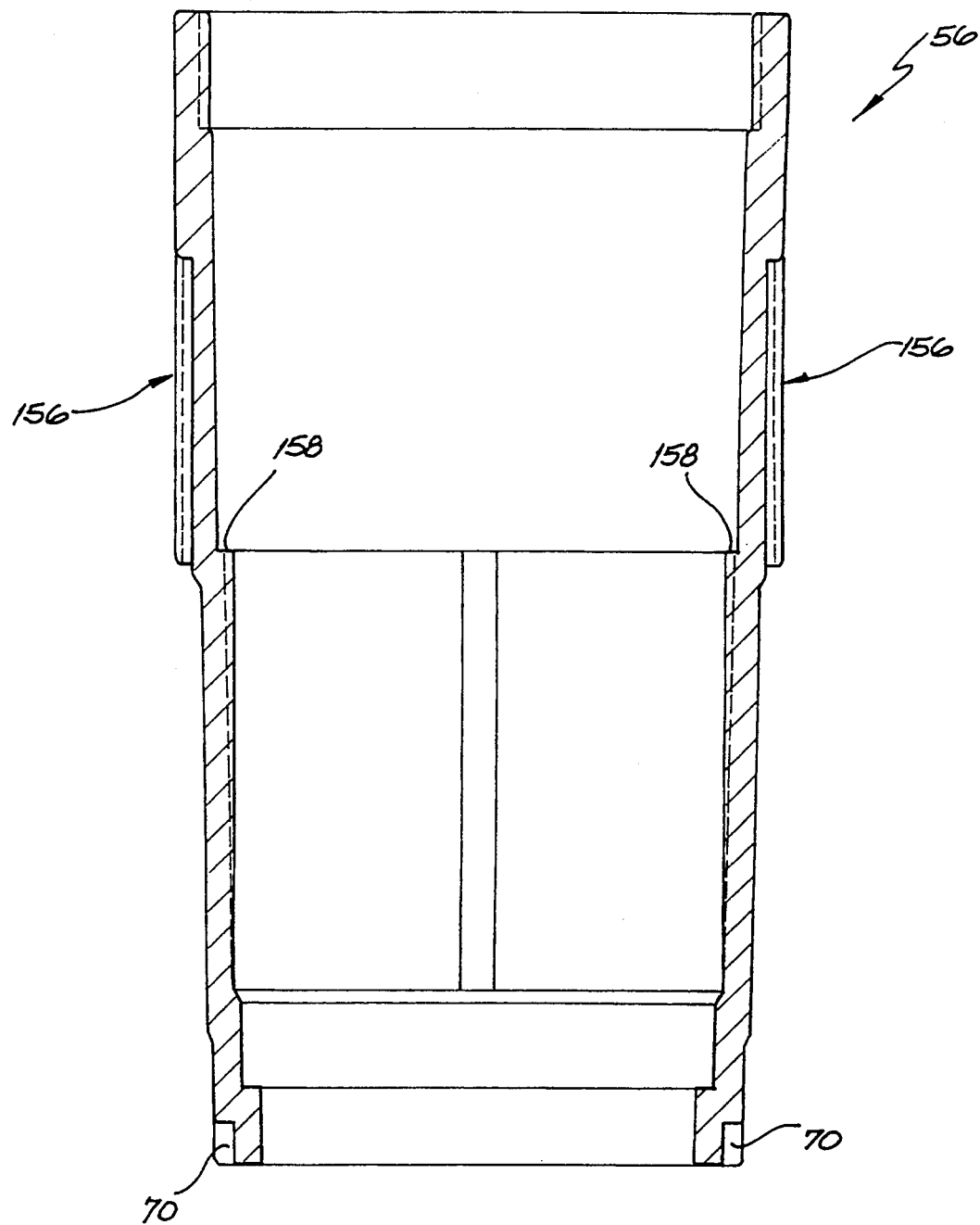
FIG. 16 shows a connecting sleeve of a second embodiment.
Figure 17:
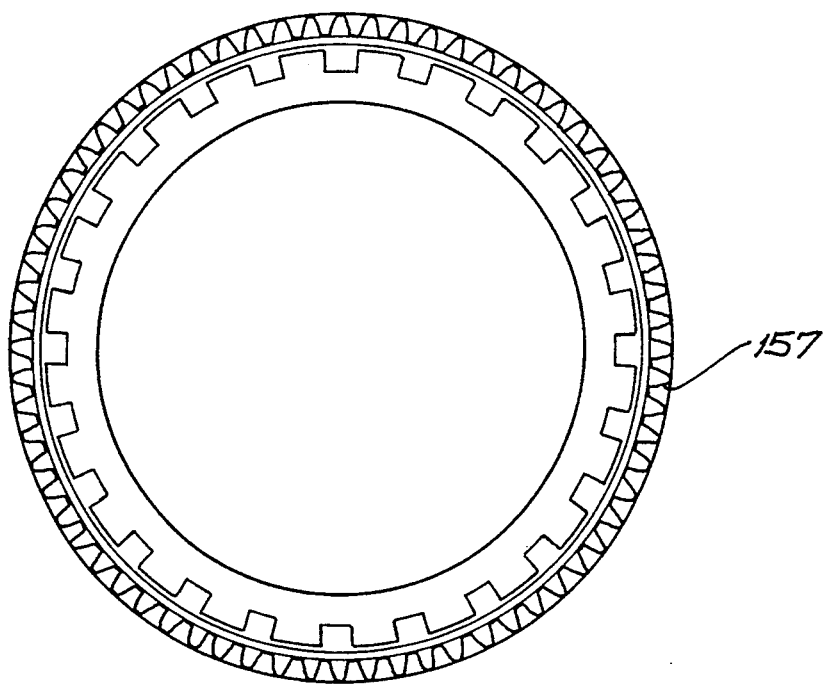
FIG. 17 is an end view of the connecting sleeve of FIG. 16

The connecting sleeve illustrated in FIG. 16 includes a surface 156 adapted to receive a gear tooth profile 157 as shown in FIG. 17. The gear teeth 157 can be driven by a meshing gear driven by a motorised means such as an air motor. The surface 156 allocated to the gears is wider than for the first embodiment.

Figure 19B:
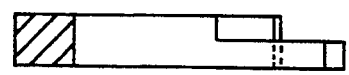
FIG. 19 shows detail of a two part connecting clip of a second embodiment.
Figure 19:
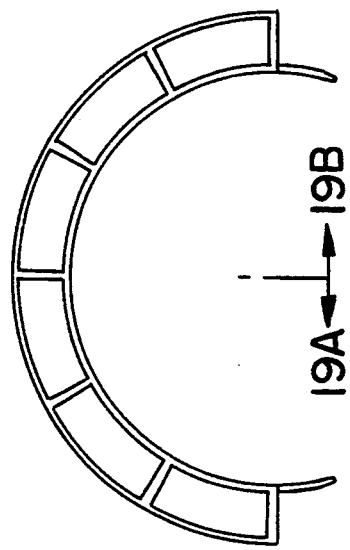
Figure 19C:
Figure 19A:
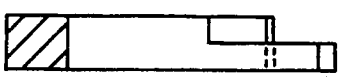

As for the first embodiment a ridge 158 is provided within the connecting sleeve to provide a surface which is engaged by connecting clip 159 (illustrated in FIG. 19).

Figure 18:
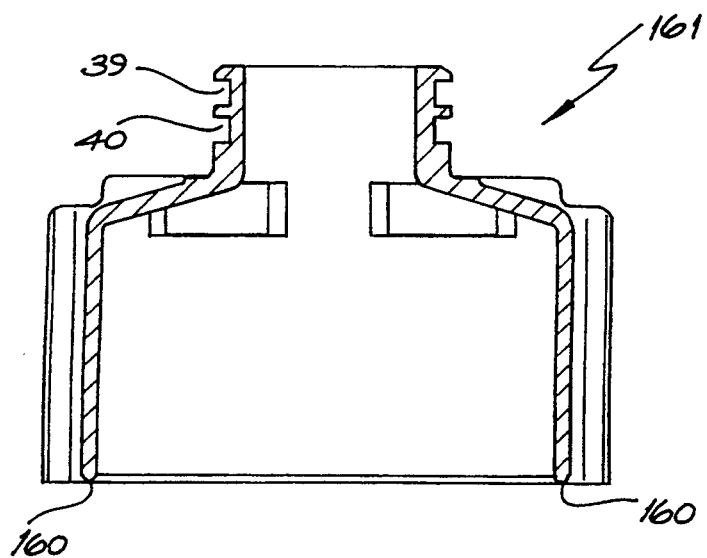
FIG. 18 shows a section through a filtrate cup of a second embodiment.
Figure 20:
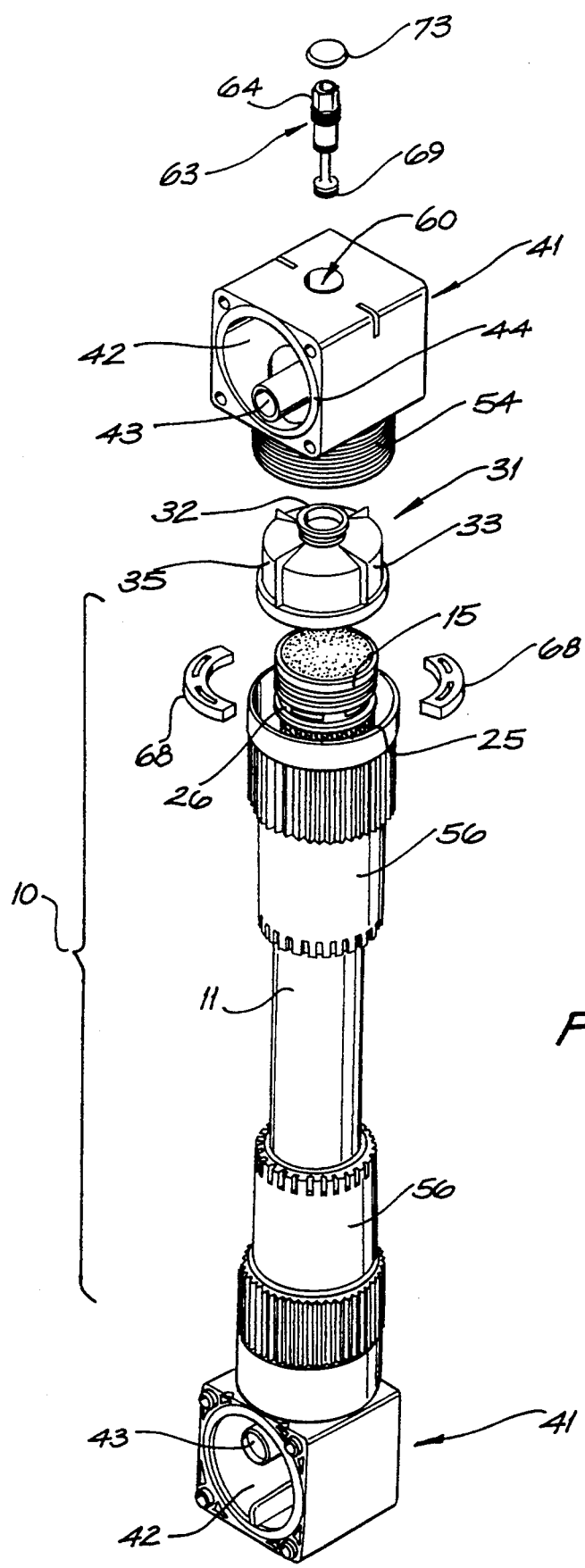
FIG. 20 is an exploded perspective view of a filter cartridge assembly and header according to a second embodiment of the invention.

The connecting clip 159 is provided in two self-engaging halves which, when engaged, fit snugly into groove 26 defined between first opposed shoulder 27 and second opposed shoulder 28 around the end region of the fibre bundle (as illustrated in FIGS. 2 and 20) and abutted against end 160 of filtrate cup 161 (illustrated in FIG. 18).

The connecting clip 159 acts as an intermediary support between ridge 158 and cup end surface 160 and allows the connecting sleeve 56 to mechanically urge the end of the filter cartridge into sealing engagement with the feed supply and filtrate removal channels in flange 46.

In addition, backwash pressure exerted against the ends of the cartridge acting so as to compress the cartridge are resisted by the action of first opposed shoulder 27 against clip 159 which in turn acts against ridge 158 which, by virtue of the mechanical connection between sleeve 56 and the header 41 will cause the cartridge ends to resist the compression.

In a modification of the invention, the screen 20 and potting cage 15 at either end thereof may be manufactured as a single integral unit with the fibre bundle made longitudinally deformable so as to allow the bundle, with potting cage attached, to be pulled clear of the headers 41 whilst the bundle remains in tubular casing 11, and the configuration of apertures in the screen may be in various forms, for example, elongated slots extending in a circumferential direction or in an interrupted helical shape.

In another modification of the invention the said perforated screen may be further modified but still retaining the plugs and potting sleeves at each end of the fibre bundle.

Various modifications may be made in details of design and construction without departing from the scope and ambit of the invention.

We claim:

1. A replaceable elongate and symmetrical filter cartridge comprising:
    A. An elongate filter medium comprising microporous hollow fibers adapted to be confined within an outer casing and terminating in opposed ends, said medium being adapted to be in fluid communication with at least first and second headers;
    B. each of said opposed ends including a corresponding first and second end caps;
    C. said end caps binding said filter medium at each opposed end and being adapted to releasably mechanically supported so as to maintain said opposed ends of said filter medium a predetermined distance apart;
    D. said cartridge further comprising at least one connecting sleeve, axially slideable relative to said end caps and sealably engageable with said outer casing and said first and second headers.

2. A filter cartridge assembly comprising at least one replaceable filter cartridge of claim 1, further comprising at least one slideable cup which is slideable over said end cap so that a duct defined within said end cap is extended beyond said opposed ends of said medium.

3. The filter cartridge assembly of claim 2, wherein when said slideable cup is located at each end of said cartridge in an extended position said cartridge is mounted for fluid communication within a filter assembly of the double ended, opposed header type; and when said cup is in a retracted position said cartridge can be removed from said filter assembly by a lateral movement with respect to the longitudinal axis of the cartridge.

4. A filter cartridge assembly of claim 3 together with said outer casing sealably engaged with at least one inlet header and at least one outlet header, in fluid communication with each, wherein said outer casing is adapted to provide a path to or away from an outer surface of said filter medium.

5. The filter cartridge assembly of claim 4, wherein said outer casing comprises an elongated tubular casing extending substantially the length of and shrouding said filter cartridge together with first and second connecting sleeves located at and slideable along respective first and second ends of said tubular casing.

6. The filter cartridge assembly of claim 5, wherein said tubular casing includes an external ridge encircling said respective first and second ends; said ridge adapted to seat against a corresponding inner ridge located at the lower end of each said connecting sleeve whereby when each of said connecting sleeves is in sealing engagement with respective first and second headers located a predetermined distance apart, said ridges are in mating relationship whereby said tubular casing is maintained in fixed mechanical relationship with respect to said first and second headers and a sealed chamber is defined between said headers.

7. The filter cartridge assembly of claim 6, wherein said first and second connecting sleeves further include respective first and second shoulder portions located on an inner surface; said first and second shoulder portions each adapted to engage a circular clip so that supporting pressure is applied by means of said clip to a first one of said opposed shoulders defining a groove in said cap when said connective sleeve is in sealed, mating relationship with said header so that said cap is mechanically supported against motion along the longitudinal axis of said cartridge in a first direction while the other of said opposed shoulders defining said groove in said cap is mechanically supported against an opposed surface of said clip which, in turn, is mechanically urged against a lower rim portion of said slideable cup thereby urging said slideable cup to an extended position with respect to said cartridge so that an opposite end of said slideable cup is urged into sealing relationship with said header at the same time that said connecting sleeve is in sealed, mating position with respect to said header to define a sealed chamber divided into a first outer chamber external to the outer surface of said media and a second inner chamber defined by the internal surface of said filter medium so that feed can pass from said header into said outer chamber, through said filter medium which removes particulate matter above a predetermined size therefrom and into said inner chamber and then out of said cartridge via the inside of said slideable cup to said header.

8. The filter cartridge assembly of claim 7, wherein said clip includes ducts passing therethrough for the purpose of allowing fluid communication between said header and said outer chamber.

9. The filter cartridge assembly of claim 8, wherein said clip comprises two separate semi-circular halves adapted to mechanically engage about said cap so as to form a single, circular clip.

10. The filtration assembly of claim 2 comprising a plurality of said replaceable filter cartridges arranged in banks; said inlet header and said outlet header comprising, in combination, a header assembly having a first passageway lying wholly within a second passageway; said first passageway preventing liquid in said first passageway from mixing with liquid in said second passageway within the confines of said header.

11. The filtration assembly of claim 10, wherein an outlet from one of said first passageway or said second passageway to said filter cartridge assembly is selectively sealable by valve means.

12. The filtration assembly of claim 11, wherein said valve means lies within said header and is operable from outside said header.

13. The filtration assembly of claim 12, wherein the status of said valve means can be ascertained by visual inspection of the exterior of said header.

14. The filtration assembly of claim 10, wherein said first passageway communicates with opposed ends of said header and with a third face of said header which is adapted to communicate with said filter cartridge assembly; and said second second passageway communicates with opposed ends of said header and with a third face which is in independent communication with said filter cartridge assembly.

15. The replaceable filter cartridge of claim 1, wherein said medium comprises a bundle of microporous hollow fibers; each of said fibers comprising said bundle being generally aligned along the longitudinal axis of said cartridge.

16. The replaceable filter cartridge of claim 15, wherein each said end cap engages the outer perimeter of said bundle so as to bind said filter medium.

17. The replaceable filter cartridge of claim 16, wherein a potting compound is located around said medium within the confines of said end cap so as to create a plug which binds said medium to said end cap.

18. The replaceable filter cartridge of claim 17, wherein said end cap comprises a short cylinder whose inner surfaces are profiled wherever they immediately adjoin exterior surfaces whereby a tortuous path is created along the inner surface of said cap from one end of said cap to the other.

19. The replaceable filter cartridge of claim 18, wherein said potting compound extends into and around said profiled inner surfaces to the extent that said potting compound, when set, includes opposed flanges which interact with the edges of both ends of said end cap so as to prevent said potting compound from being slideable out of said end cap.

20. The replaceable filter cartridge of claim 16, wherein said end cap includes engagement means for engaging portions of said outer casing so that said end cap is maintained in a fixed mechanical relationship with respect to said outer casing.

21. The replaceable filter cartridge of claim 20, wherein said engagement means comprises a groove encircling the periphery of said end cap bordered by opposed shoulder portions; said shoulder portions adapted to engage mating shoulder portions of a circular clip which is adapted to be seated within said groove.

22. The replaceable filter cartridge of claim 20, further including adjacent, parallel grooves circumscribing a top end of said end cap and adapted to receive O-rings to seal said end cap against an outer sealing surface.

* * * * *